United States Patent
Klein Koerkamp

(10) Patent No.: US 9,457,557 B2
(45) Date of Patent: Oct. 4, 2016

(54) METHOD FOR GENERATING RELIEF PRINTS

(71) Applicant: OCE-TECHNOLOGIES B.V., Venlo (NL)

(72) Inventor: Koen J. Klein Koerkamp, Venlo (NL)

(73) Assignee: OCE-TECHNOLOGIES B.V., Venlo (NL)

( * ) Notice: Subject to any disclaimer, the term of this patent is extended or adjusted under 35 U.S.C. 154(b) by 0 days.

(21) Appl. No.: 14/987,209

(22) Filed: Jan. 4, 2016

(65) Prior Publication Data

US 2016/0193823 A1  Jul. 7, 2016

(30) Foreign Application Priority Data

Jan. 5, 2015  (EP) .................................. 15150091

(51) Int. Cl.
| | | |
|---|---|---|
| *H04N 1/60* | (2006.01) | |
| *B41C 1/12* | (2006.01) | |
| *B29C 67/00* | (2006.01) | |
| *H04N 1/54* | (2006.01) | |
| *H04N 1/58* | (2006.01) | |
| *G06K 1/00* | (2006.01) | |

(52) U.S. Cl.
CPC ............. *B41C 1/12* (2013.01); *B29C 67/0051* (2013.01); *H04N 1/54* (2013.01); *H04N 1/58* (2013.01)

(58) Field of Classification Search
CPC ...... B41C 1/12; B29C 67/0051; H04N 1/54; H04N 1/58
See application file for complete search history.

(56) References Cited

U.S. PATENT DOCUMENTS

| 7,589,868 B2 * | 9/2009 | Velde ........................ B41C 1/00 358/1.9 |
| 8,976,415 B2 * | 3/2015 | Klein Koerkamp ............... B05D 5/06 358/2.1 |
| 2008/0258339 A1 | 10/2008 | Conrad |

FOREIGN PATENT DOCUMENTS

| EP | 1437882 A1 | 7/2004 |
| EP | 2 672 692 A2 | 12/2013 |

OTHER PUBLICATIONS

Kerber et al., "Computer Assisted Relief Generation—a Survey", Computer Graphics Forum, vol. xx (200y), No. z, Sep. 1, 2012, pp. 1-14.
Anonymous, "Kernel (image processing)," Wikipedia, XP055278578, May 29, 2014, 3 pgs.
Kerber et al., "Computer Assisted Relief Generation—a Survey," Computer Graphics Forum, vol. xx (200y), No. z, Sep. 2012, pp. 1-14.

* cited by examiner

*Primary Examiner* — Quang N Vo
(74) *Attorney, Agent, or Firm* — Birch, Stewart, Kolasch & Birch, LLP

(57) ABSTRACT

A method for generating a relief print on a substantially flat substrate, wherein palpable differences exist between a height of various parts of the relief print, by a printer configured to print a relief print in a number of passes includes defining a rasterized relief image, comprising customary color channels for indicating a color of each pixel and a height channel for indicating a height of each pixel of the rasterized relief image, determining a low spatial frequency height component in the height value of a pixel of the rasterized relief image, subtracting the determined low spatial frequency height component from the relative height value of a pixel of the rasterized relief image, resulting in a relative reduced height value, and printing the rasterized relief image by using the relative reduced height value. A printing system is configured to execute the method.

9 Claims, 11 Drawing Sheets

METHOD FOR GENERATING RELIEF PRINTS

CROSS-REFERENCE TO RELATED APPLICATIONS

This application claims priority under 35 U.S.C. §119(a) to Application No. 15150091.5 filed in Europe on Jan. 5, 2015, the entire contents of which is hereby incorporated by reference into the present application.

BACKGROUND OF THE INVENTION

1. Field of the Invention

The present invention relates to a method for generating a relief print on a substantially flat substrate, wherein palpable differences exist between a height of various parts of the relief print, by a printer being configured to print a relief print in a number of passes, the method comprising the step of:

a) defining a rasterized relief image, comprising customary color channels for indicating a color of each pixel and a height channel for indicating a height of each pixel of the rasterized relief image.

The present invention further relates to a computer program product, including computer readable code embodied on a non-transitory computer readable medium, said computer readable code comprising instructions for generating a relief print and to a print system configured to generate relief prints. In addition to the term "height" the alternative term "elevation" is used in the present specification.

The plurality of pixels is indicated to be located in an XY plane, while the direction of the height of a pixel is indicated as a Z direction.

2. Description of Background Art

A process for generating a relief print is described in European patent application EP2672692. Due to a large amount of layers which have to be ejected in order to generate a relief print, a print time of a relief print is usually large and a high marking material usage is usually the case.

SUMMARY OF THE INVENTION

An object of the present invention is to provide a method for generating a relief print, which has a shorter print time, a lower marking material usage and the same print quality.

According to the present invention, this object is achieved by the method according to the invention, wherein the method comprises the steps of:

b) determining a low spatial frequency height component of a height value of a pixel of a rasterized relief image;

c) subtracting the determined low spatial frequency height component from the height value of a pixel of the rasterized relief image, resulting in a reduced height value; and d) printing the rasterized relief image by using the reduced height value.

The low spatial frequency component of the height value of a pixel is the component of the height value, which does not substantially vary in a predetermined environment of the pixel in the relief image, i.e. the component of the height value has a low spatial frequency. By determining the low spatial frequency component in the height of the pixel of the rasterized relief image and subtracting the low spatial frequency component from the height value of the pixel, the resulting reduced height value is lower than the original height value. Applying these steps of determining and subtracting for the pixels of the relief image reduces the amount of marking material to be ejected in order to generate the relief image.

By reducing the amount of ejected marking material, the print time of the relief print is also reduced. By using the low spatial frequency component of the height value, the removal of these components from the height values of the relief image, is not noticeable in the final print. In this way, the print quality of the relief print is assured.

According to an embodiment of the method, the step of determining the low spatial frequency height component in the height value for the pixel comprises a step of applying a filter operation by means of a convex kernel. Kernel operations are well known in image processing. A convex kernel is a matrix of values, which form a convex shape emerging from the XY plane in the Z direction when depicted in an XYZ space. The determination of the low spatial frequency height component in the height values of the pixels is accomplished by comparing values of the convex kernel with height channel values of the rasterized relief image. In other words, the convex kernel is emerging under the surface of the rasterized relief image at the position of the pixel in the relief image. The filter operation reduces the height of a relief image to be printed without affecting the visual appearance of the print. The height difference between the top of the convex kernel and a position in the XY plane about 5 cm from the top may be 1 mm. The highest value in the convex kernel may be determined by the highest height channel value of the rasterized relief image.

Other convex kernels may be envisioned with a similar shape to remove low spatial frequency height parts of the relief image.

In order to determine how much height can be reduced at each position in the image, the kernel is moved over a plurality of positions in the image. For each position, a minimum height difference between the image height and the kernel height is determined. When the minimum height difference has been determined for each of the plurality of positions, the determined minimum height difference is the low spatial frequency height component that is to be subtracted from the height of the image at the position of the respective pixel.

According to an embodiment, the step of determining the low spatial frequency height component is applied to a plurality of pixel positions of the rasterized relief image, and the plurality of pixel positions is determined by a first step size of the filter operation in a first direction of the rasterized relief image perpendicular to a height direction and a second step size of the filter operation in a second direction of the rasterized relief image perpendicular to the height direction and not parallel to the first direction.

By defining step sizes in two non-parallel directions in the XY plane of the image, a raster of pixel positions is created for determining the low spatial frequency height component at each position. The larger the step size that is chosen, the larger the processing speed of the filter operation. The first step size and the second step size may be determined to be equal in size. The step sizes may be entered in a control system of the printing system beforehand.

According to an embodiment, the first step size and the second step size are equal to the size of one pixel dimension. By doing so, the accuracy of the marking material reduction is increased.

According to an embodiment, the method comprises the step of adapting the convex kernel by broadening the top of the convex kernel by the first step size in the first direction and by the second step size in the second direction. This is advantageous, since filter artefacts in the relief image to be printed will be prevented.

According to an embodiment, a three-dimensional representation of the convex kernel has a paraboloidal shape. Other convex shapes may be envisioned for the kernel such as a pyramidal shape, a conical shape, a semi sphere, etc.

According to an embodiment, the method comprises the steps of:

e) dividing the rasterized relief image into a central region and an edge region, the edge region consisting of image pixels that are within a predetermined distance from an edge of the rasterized relief image;

f) applying the steps a)-d) to the central region of the rasterized relief image, for a pixel in the edge region;

g) determining a low spatial frequency height component in the height channel of the pixel to be equal to the low spatial frequency height component of a closest pixel in the central region;

h) subtracting the detected low spatial frequency height component from the height of the pixel resulting in a reduced height; and i) clipping the reduced height to a zero height value, if the reduced height has a negative value.

This embodiment is especially useful when the relief image is a scan of a painting that has a frame. The edge of the frame is a high frequency height difference, which is not removed with the filter operation according to the previous embodiments. A result of applying the method according to the previous embodiments, the thickness of the frame is still present in the corrected relief image. Since the frame thickness is usually much larger than a texture in the painting, a significantly longer print time is needed. Also, the marking material usage to print such an edge is significantly more than what is required for the rest of the painting. By applying this embodiment of the method, the adapted heights of the pixel positions at the edges of the image do not contain the height of the frame. Both the marking material usage and the maximum height of the relief print, which directly determines the print time, are significantly reduced.

The present invention also relates to a print system configured to generate relief prints on a substantially flat substrate in a number of passes, wherein palpable differences exist between a height of various parts of the relief print, the print system comprising a print controller and a print engine, the print controller comprising a receiving unit configured to receive a rasterized relief image, comprising customary color channels for indicating a color of each pixel and a height channel for indicating a height of each pixel of the rasterized relief image; determining unit configured to determine low spatial frequency height component in the height channel of a pixel of the rasterized relief image; a subtracting unit configured to subtrace the determined low spatial frequency height component from the height of a pixel of the rasterized relief image resulting in a reduced height, wherein the print engine is configured to print the rasterized relief image by taking the reduced height of the pixel into account.

The present invention also relates to a computer program product, including computer readable code embodied on a non-transitory computer readable medium, said computer readable code comprising instructions for executing the steps of the method according to any of the previous embodiments.

Further scope of applicability of the present invention will become apparent from the detailed description given hereinafter. However, it should be understood that the detailed description and specific examples, while indicating preferred embodiments of the present invention, are given by way of illustration only, since various changes and modifications within the spirit and scope of the present invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
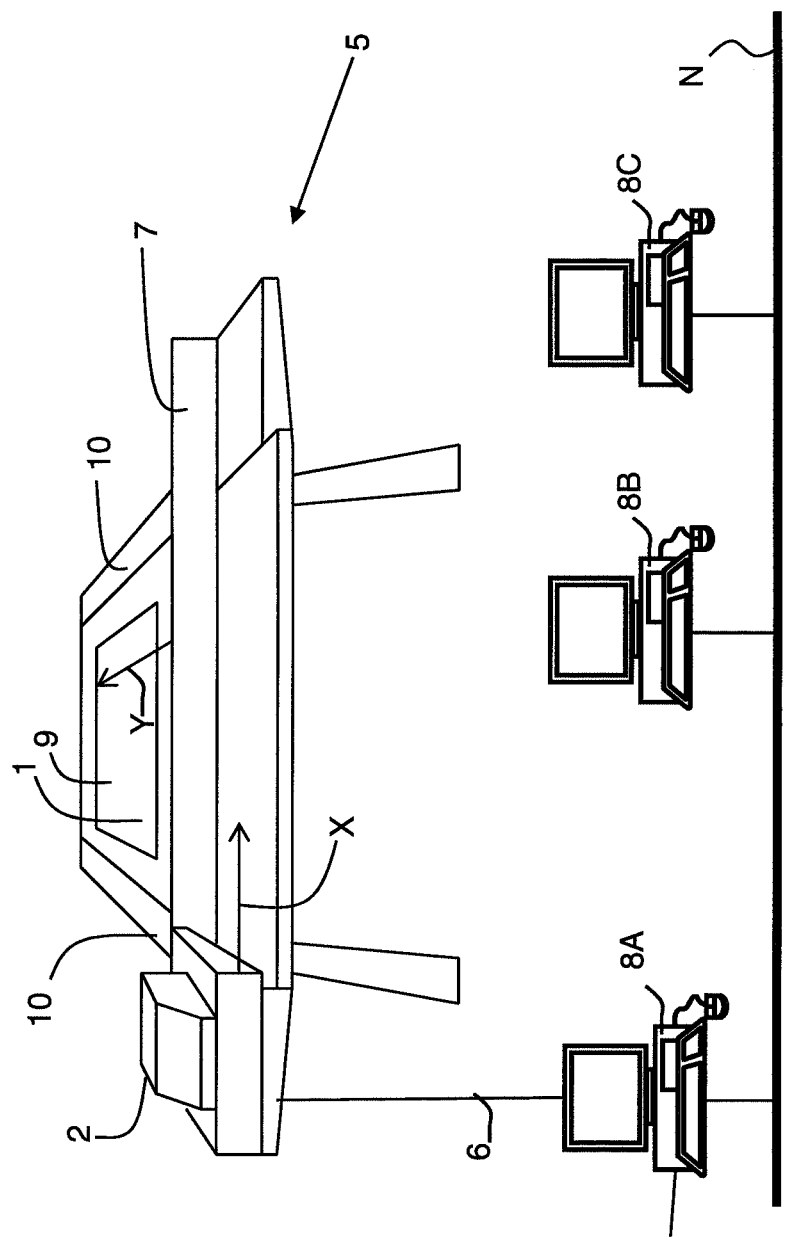
FIG. 1 is a print system in which the invented method is applicable.

The present invention will now be described with reference to the accompanying drawings, wherein the same reference numerals have been used to identify the same or similar elements throughout the several views.

FIG. 1 is a print system comprising a number of workstations 8B and 8C, which may be personal computers or other devices for preparing color image data for relief prints to be printed. These workstations have access to a network N for transferring the color image data to a print controller 8A that is configured to receive print jobs for relief prints and derive pass images. The print system further comprises a print engine 2 for applying colorants, in this embodiment cyan (C), magenta (M), yellow (Y), black (K) and white (W) colorant, to a flat print medium 9, the substrate, in order to obtain a printed image. In this embodiment, a UV-curable or hot-melt marking material is applied by print heads that reciprocally scan the substrate in a direction X perpendicular to a transport direction Y by means of a gantry 7. The marking material solidifies upon cooling after printing on the substrate. The present invention is applicable to using UV-curable marking materials that solidify after exposure to UV-light and other types of marking material that are printed in a layer with some thickness on a substrate.

Print engines may be used that are suitable for printing on rigid elements, e.g. a flatbed printer. Preferentially, the distance between the flat substrate and the print elements that are used to apply the various colorants, is variable. This distance may be varied in order to keep the relief surface within the latitude of the print elements. The latitude of the distance between a substrate of the scanning print head is in print engine 2 about 0.5 to 2 mm.

The printer comprises a user interface (not shown), which is placed on the print engine, but which may also be part of the printer controller 8A, for selecting a print job and optionally adapt a print job parameter, such as an absolute height parameter for indicating a maximum height of the relief print. In this embodiment, a maximum number of passes for one pixel is used as a height parameter. In another embodiment, a user interface is provided as a network site that is accessible with a browser on a client computer.

After sending a print job comprising image data from a workstation to the printer controller, the print job will be made visible on the user interface. It may be scheduled for further processing after selection from a list of print jobs or, alternatively, if the print job is on the top of the list of print jobs. The print job comprises parameter values that determine the way the image data are to be printed, such as how the image data are to be converted into print data.

A manner of converting relief image data into pass images is described in European patent application EP2672692.

Figure 2:
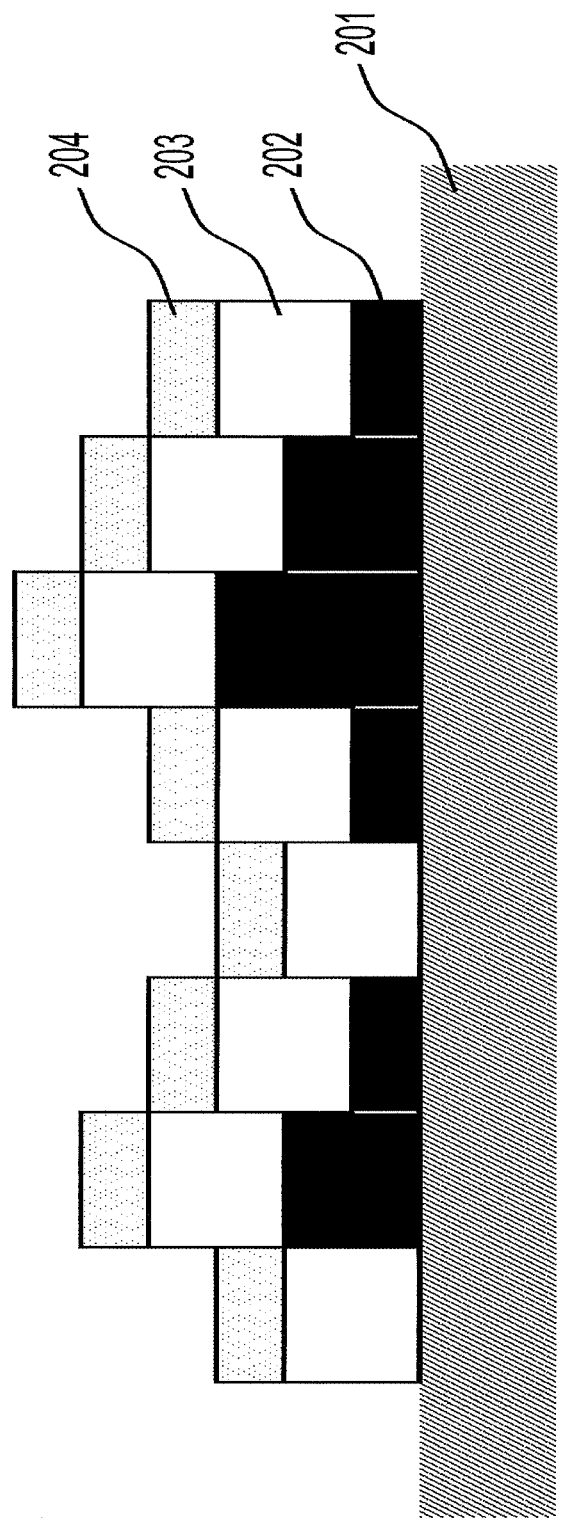
FIG. 2 is a crosscut of a relief print according to the present invention.

FIG. 2 is a crosscut of a relief print according to patent application EP2672692. On substrate 201, a number of pixels is printed comprising a relief part 202, a white part 203 and a skin part 204. The height variation of the individual pixels on the flat substrate 201 is caused by repetitive printing of colorants in the relief part 202. All available colorants may be used in the relief part, which provides for an optimal print speed for this part. The white part 203 is printed on top of the relief part 202 to conceal the colorants used therein and to provide a standard white background for the colorants in the skin part 204. The combination of colorants in the skin part is generated from a color management module that is calibrated for flat prints using the color channels of a rasterized digital image. It should be noted that a predetermined thickness for the white part of the pixels is used, determined by the opacity of the white marking material, which results in a background that is the same for all pixels.

Figure 3:
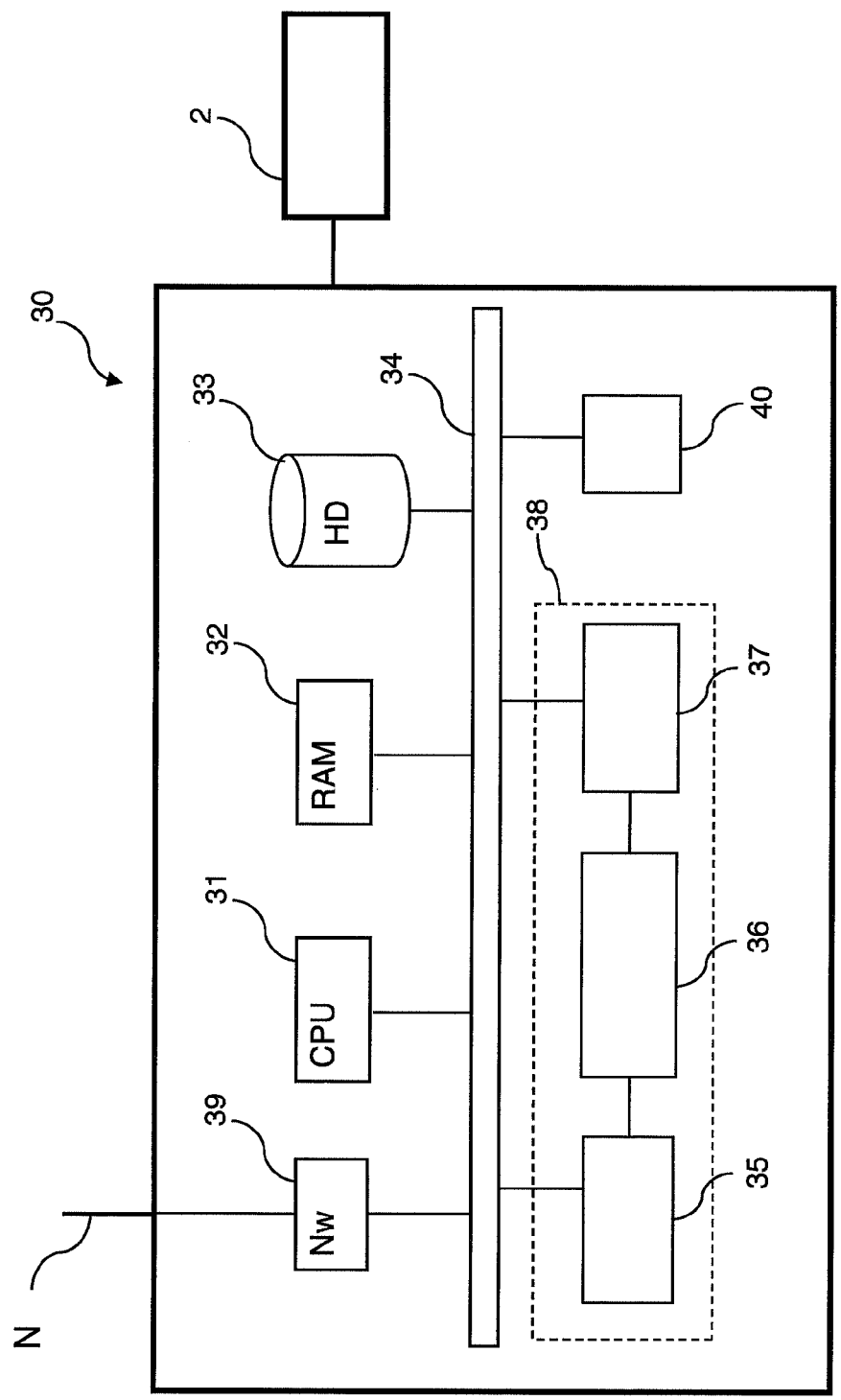
FIG. 3 is an arrangement of computer elements to implement the present invention.

FIG. 3 shows a configuration of the printer controller 8A with its connection to a network N and a print engine 2. The printer controller comprises a network adapter 39, a central processing unit 31, volatile memory 32 and non-volatile memory 33, all connected to a central bus 34 for exchanging data, including color image data as received through the network. Furthermore, a raster image processor (RIP) 38 is part of the printer controller 30 for converting the image data into pass images. In a first module 35, the image data are rasterized and for each pixel, a relief part, a white part and a skin part is set. In module 36, a colorant composition is determined, depending on the part of the pixel. For the relief part, all colorants are equally used and the first available colorant is inserted. An alternative may be to use a colorant that is the least expensive one. For the white part only, the white colorant is used and for the skin part, a conversion of color data is performed using input and output color profiles as defined by the International Color Consortium. In module 37, the skin part of the pixels is screened or halftoned and the pass images are composed that comprise the pass pixels that are printed successively on top of each other. These pass images are saved in the order in which they are composed and may be sent to the print engine 2 or be saved for later reproduction. If a pass pixel is not inserted in a pass image, because a neighboring pass pixel contributes to the white part of a corresponding pixel in the relief print, the pass pixel is saved and inserted in a next pass image. Neighboring pixels in this embodiment are pixels that are part of the Moore neighborhood of a pixel in the two-dimensional rasterized image.

Module 40 comprises hardware and/or software applications programmed to execute embodiments of the method according to the present invention. The module 40 comprises a low spatial frequency height component determining device and a subtracting device for reducing heights of pixels of the relief image according to the method of the present invention.

Figure 4:
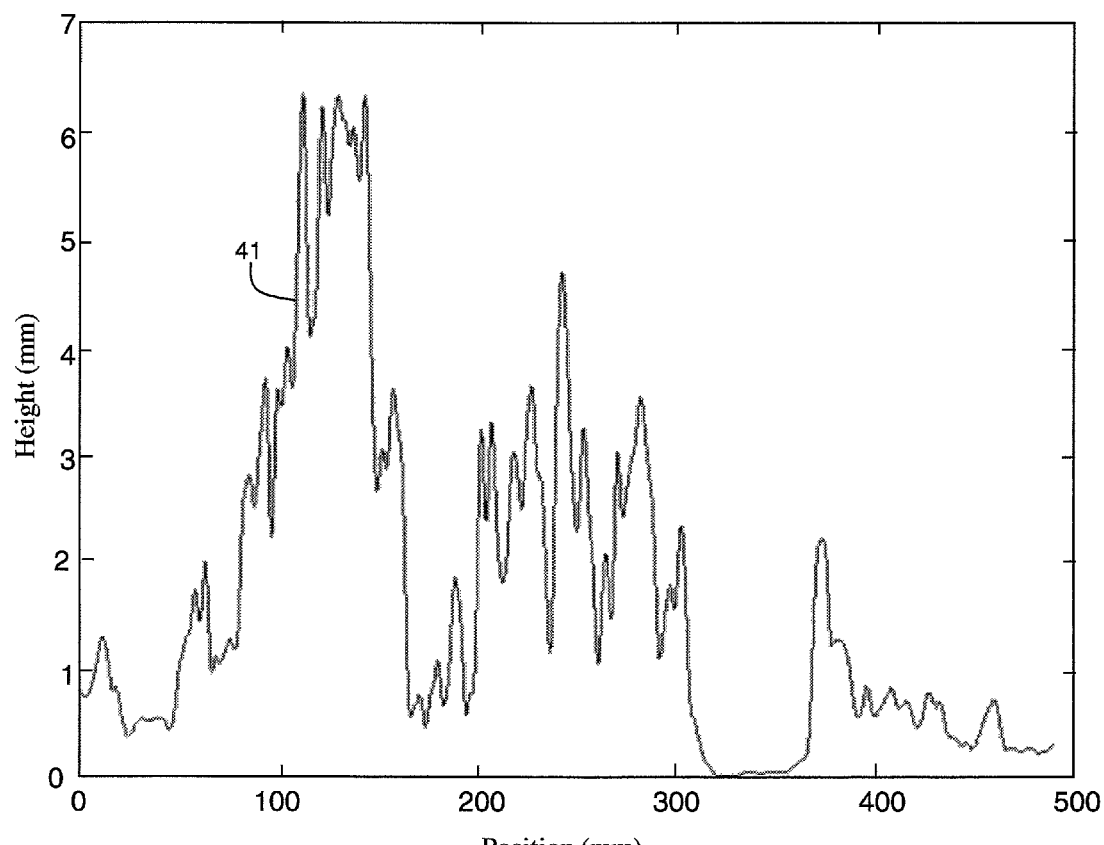
FIG. 4 displays a crosscut of the height profile of a relief image.

FIG. 4 shows a cross section of the height profile 41 for a first digital image. For convenience reasons, a scale of a horizontal axis and a scale on a vertical axis are not equal. On the horizontal axis, a position of a pixel in the image is shown for a specific X ordinate in millimeters (mm). On the vertical axis, height values of the pixels are shown in millimeters (mm). The part of the image left of the position of 300 mm is completely elevated by at least 0.4 mm. Such an elevation over such a distance has visually no meaning. Slowly varying elevations are not visible. Only elevation differences over small distances are visible. The elevation left of position 300 mm can just as well be reduced by removing all low spatial frequency height differences. Such a removal reduces marking material usage and print time, while the visual appearance of the print stays the same.

According to an embodiment of the present invention, an image processing filter is used that reduces the height of an image without affecting the visual appearance of the print. It is based on a kernel operation with a kernel with a convex shape. An example of such a kernel is shown in FIG. 5.

Figure 5:
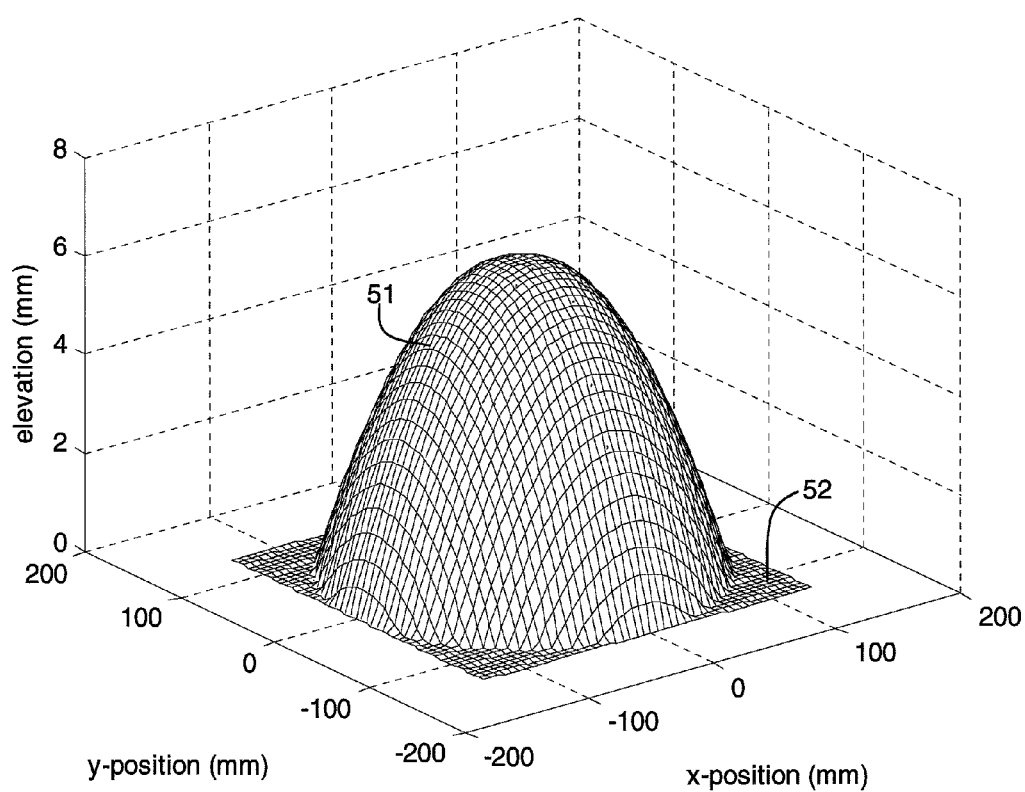
FIG. 5 displays a three-dimensional representation of the kernel used in the method according to the present invention.

FIG. 5 displays a three-dimensional representation of the kernel 51 of a paraboloidal shape. The height difference between the top and a position about 5 cm of the top is 1 mm. Other kernels with a similar convex shape may be envisioned to remove low spatial frequency height parts of the image. The matrix of the kernel is envisioned as a rectangle in the XY plane. In each corner 52 of the matrix, the values in the kernel are equal to zero.

In order to determine how much the height can be reduced at each of a plurality of positions in the image, the symmetrical axis of the kernel is positioned through the position in the XY plane of the image in the height direction perpendicular to the XY plane.

In an embodiment, the kernel 51 is shifted upwards in the height direction until the paraboloid touches a surface point of the relief image. A surface point of the relief image may be defined as the white part 203 of the pixel together with the skin part 204 of the pixel, as explained in FIG. 2. The position of the touched surface part does not have to collide with the top of the paraboloid, but may collide with another point of the paraboloid. The position of the kernel at the touching moment determines a minimum height difference between the height of the position at the surface of relief image and the height of the top of the kernel. The height of the top of the kernel is subtracted from the height of the position, resulting in a reduced height value for the position.

The reduced height is determined for each of the plurality of positions in the relief image, i.e. the kernel is moved over each of the plurality of positions.

In an accurate embodiment, a reduced height is determined for each pixel position. In another embodiment, in order to increase a speed of the filter operation, the kernel is moved over the image with a step size in a first direction and a step size in a non parallel second direction in the XY plane, the second direction being preferably perpendicular to the first direction. Generally, a step size of 1, 2, 4, 8, 18, 32 pixels or any other step size may be experimented with in order to find a compromise between the accuracy of the marking material reduction and a processing speed increase. The step size in the first direction may differ from the step size in the second direction, for example, if the print resolution in the first direction is different from a print resolution in the second direction. The step size may also be expressed in mm.

In an alternative embodiment, a reduced height is determined for each pixel position under the kernel. When the kernel moves over the pixel positions, a plurality of reduced heights are determined for almost every pixel position. A reduced height, which is to be used when printing the relief image, is determined per pixel position by taking the minimum of the plurality of reduced heights per pixel position.

Figure 6:
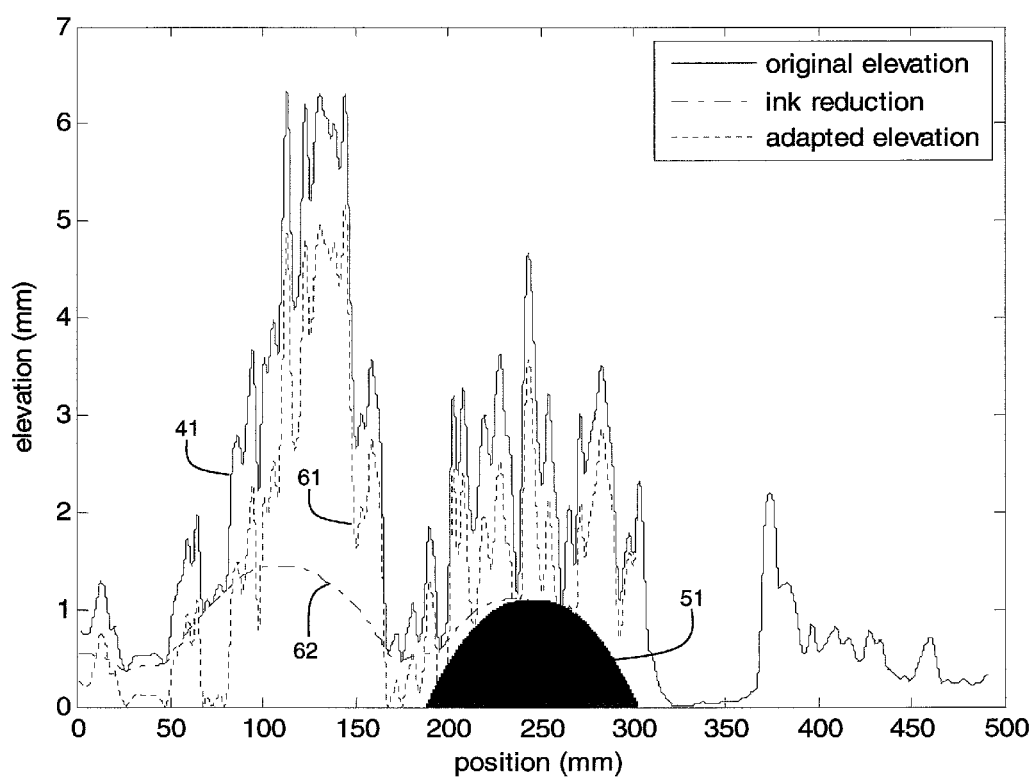
FIG. 6 displays the use of the kernel in a height profile according to the present invention.

FIG. 6 shows a one dimensionally visualized example of the kernel 51 under the surface of the relief image represented by the height profile 41. The kernel 51 has already moved from a zero position to a position at approximately 250 mm from the zero position in steps of 1 mm. A height difference has been determined for each of the positions in a range of 0 to 250 mm as indicated by a difference curve 62. The difference curve 62 is an indication of the marking material reduction to be achieved by the method according to the present invention. The reduced height values are displayed as a reduction curve 61.

Figure 7:
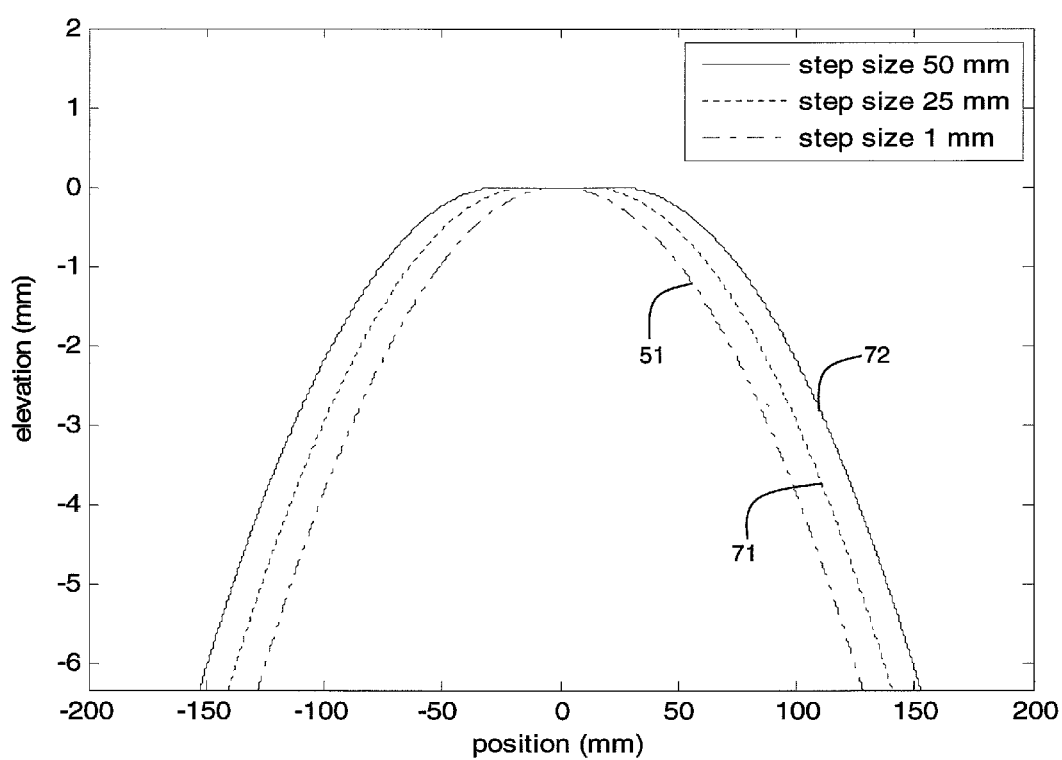
FIG. 7 displays a number of kernels with a broadened top.

FIG. 7 shows the kernel 51, which is used with a step size of 1 mm. FIG. 7 also shows a first alternative kernel 71 and a second alternative kernel 72. The first alternative kernel 71 is used with a step size of 25 mm. The second alternative kernel 72 is used with a step size of 50 mm. The top of the first alternative kernel 71 has been broadened with the corresponding step size of 25 mm. The top of the second alternative kernel 72 has been broadened with the corresponding step size of 50 mm. By doing so, filter artefacts in the relief image are prevented.

Figure 8:
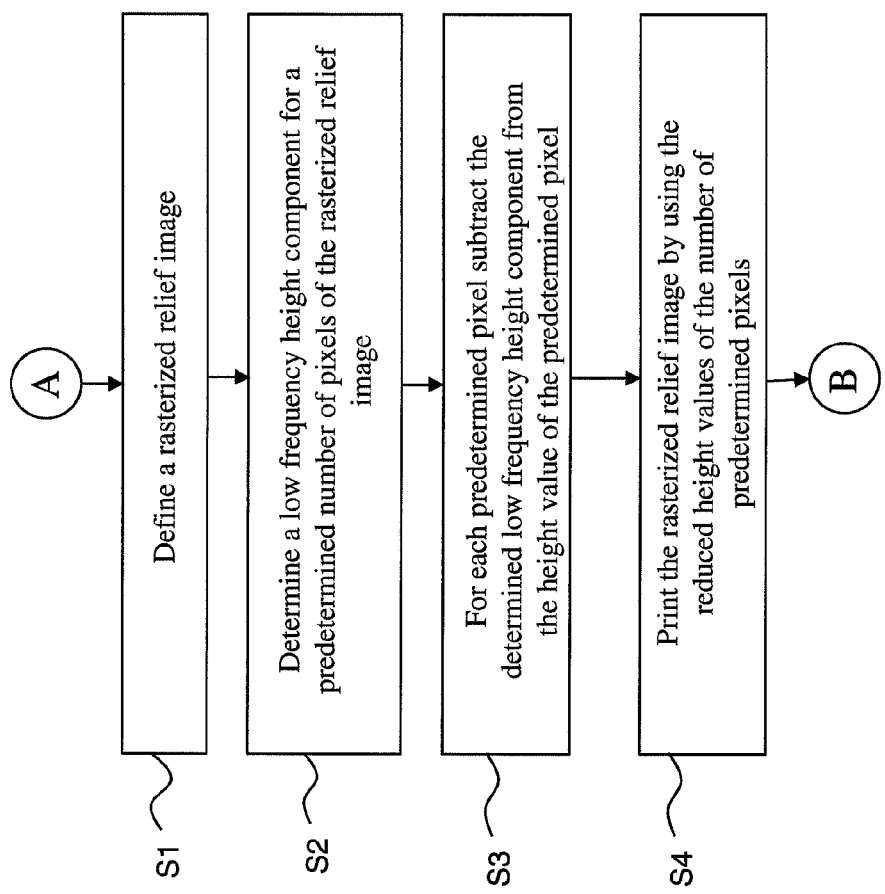
FIG. 8 is a flow diagram of a first embodiment of the method according to the present invention.

FIG. 8 is a flow diagram of an embodiment of the method according to the present invention as explained here-above. The flow diagram starts at start point A.

In a first step S1, a rasterized relief image is defined. The relief image comprises customary color channels for indicating a color of each pixel and a height channel for indicating a height of each pixel of the rasterized relief image.

In a second step S2, a low spatial frequency height component is determined in the height value of a pixel of the rasterized relief image. This step may be executed for all pixels of the rasterized relief image or for a subset of pixels of the rasterized relief image. The number of pixels for which the low spatial frequency height component is determined depends on the step size in the first direction and the second direction over the image as explained here-above.

In a third step S3, the determined low spatial frequency height component is subtracted from the height value of a pixel of the rasterized relief image, resulting in a reduced height value. The subtraction is done for all pixels involved in the second step S2.

In a fourth step S4, the rasterized relief image is printed by using the reduced height values of the pixels involved in the third step S3. The method ends at end point B.

A further embodiment will now be elucidated.

Figure 9:
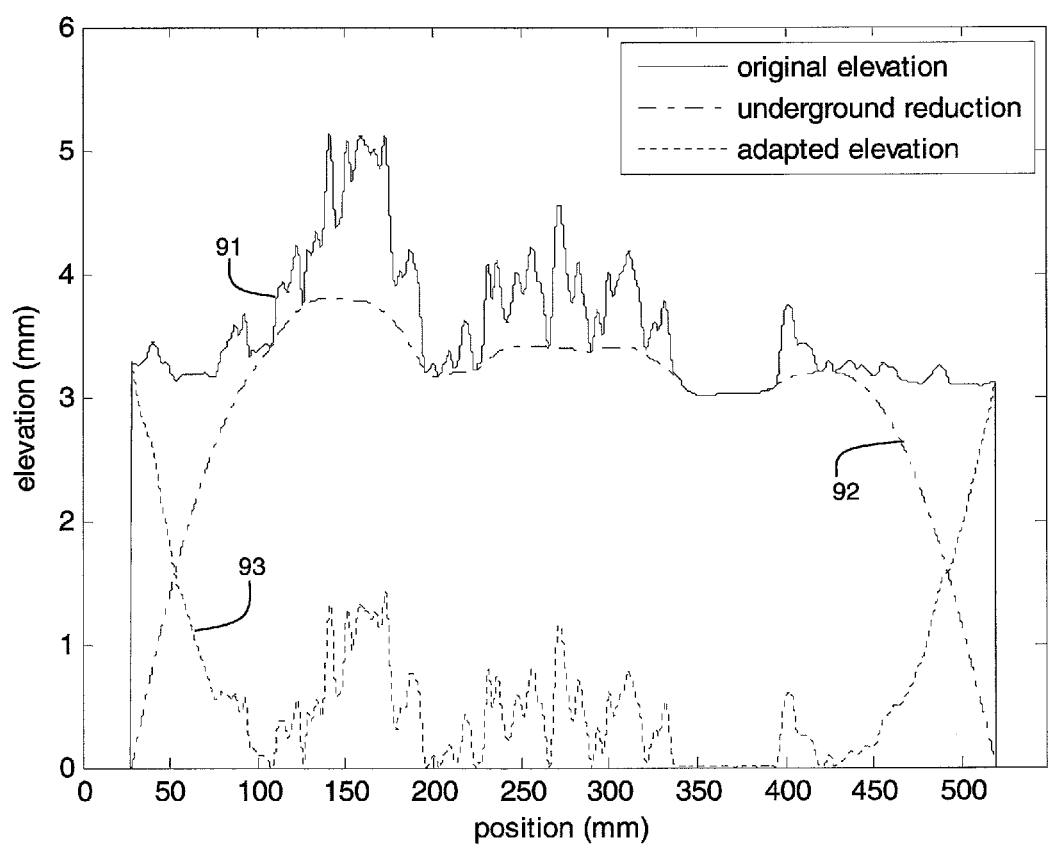
FIG. 9 is a resulting height profile after application of the first embodiment of the method in FIG. 8.

FIG. 9 shows a cross section of the height profile 91 for a second digital image. The second digital image is a textured image on top of a 3 mm thick frame. The second digital image also contains an area of about 25 mm around the edge of the frame, i.e. in a position range of 0-25 mm and in a position range of 525-550 mm. The edge of the frame is a non-representative height difference. It is not required to reproduce this edge accurately for a good image reproduction. It is therefore desirable to remove this edge from the relief image to further reduce marking material usage and print time.

For convenience reasons, FIG. 9 is a one dimensional representation. However, the further embodiment described hereinafter is applicable for a two dimensional relief image having a height component for each pixel position in the two dimensional relief image. When applying the previous embodiment of the method, a height difference has been determined for each of the positions in a range of 25 to 525 mm as indicated by a difference curve 92. The difference curve 92 is an indication of the marking material reduction to be achieved by the method according to the present invention. The reduced height values are displayed as a reduction curve 93. The reduction curve 93 has a steep growth of height on the edges near 25 mm and near 525 mm. To improve the previous embodiment, a further embodiment of the method is introduced in FIG. 10.

Figure 10:
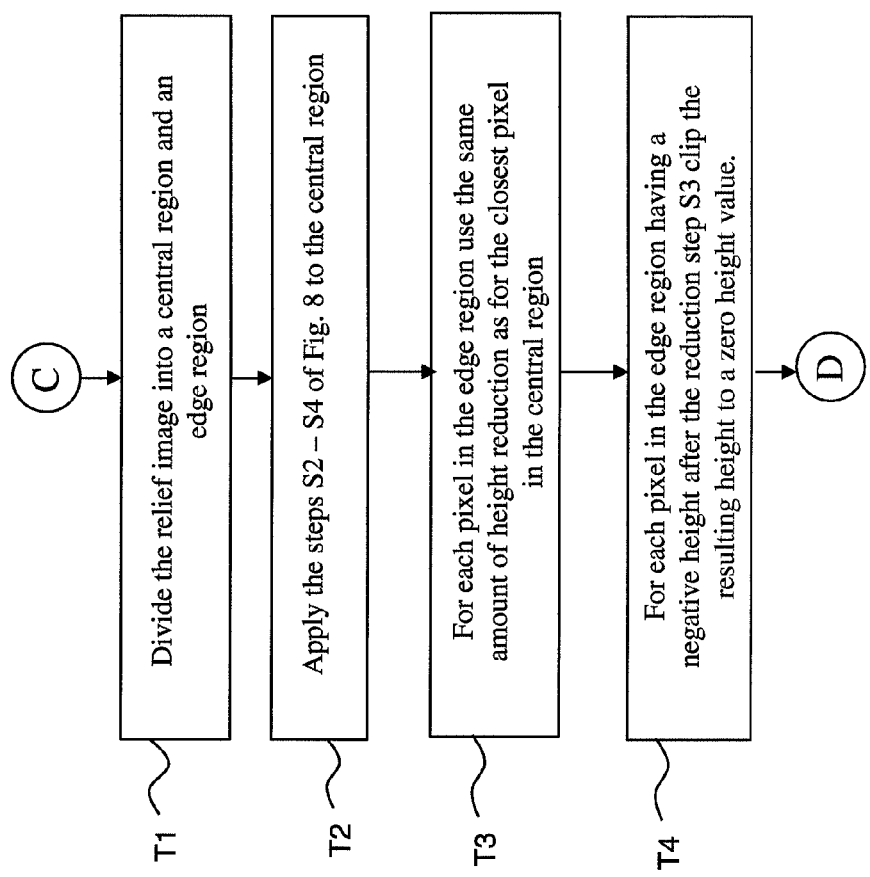
FIG. 10 is a flow diagram of a second embodiment of the method according to the present invention.

FIG. 10 is a flow diagram of the further embodiment of the method according to the present invention. The starting point is point C, which may be reached after applying the first step S1 of FIG. 8.

In a first step T1, the relief image is divided into a central region and an edge region. In the example of FIG. 9, the central region is located in a range of 25-525 mm and the edge region in the position range of 0-25 mm and in the position range of 525-550 mm. The edge region consists of all image pixels that are located within a certain, for example user specified by means of the user interface of the printing system, distance from the edge of the image. The distance may vary for at least two sides of the image.

In a second step T2, the amount of height that has to be removed from the central region is determined by applying the steps S2-S4 of FIG. 8 to the central region only.

In a third step T3, for each pixel in the edge region (including corners), the same amount of height reduction is used as for the closest pixel in the central region. In other words, for each pixel in the edge region, a pixel in the central region is determined that is closest to the pixel in the edge region. Then, the already determined low spatial frequency height component of the closest pixel in the central region is subtracted from the height value of the pixel in the edge region resulting in a reduced height value for the pixel in the edge region.

In a fourth step T4, for any pixel in the edge region that has a negative reduced height value after the third step T3, a resulting height value will be clipped to a zero height value.

The method ends at endpoint D, after which the fourth step S4 of FIG. 8 may be executed.

Figure 11:
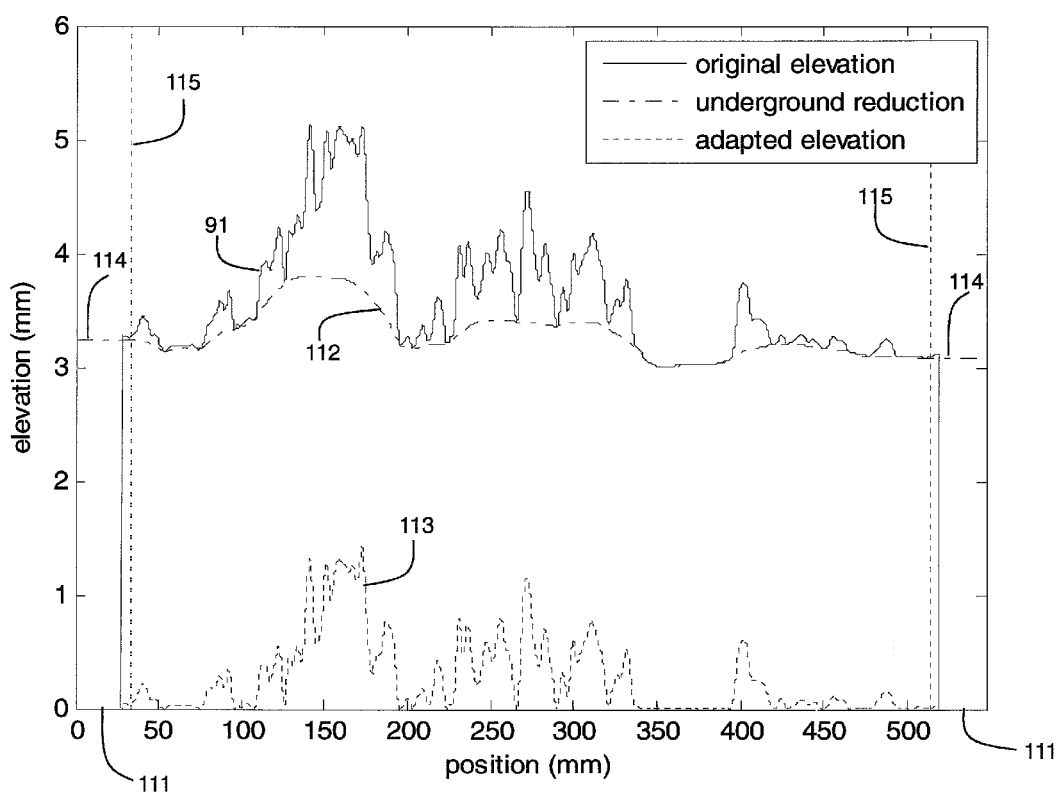
FIG. 11 is a resulting height profile after application of the second embodiment of the method in FIG. 10.

FIG. 11 shows a cross section of the height profile 91 for the second digital image in FIG. 9 after application of the further embodiment of the method according to the flow diagram in FIG. 10.

The edge region 111 is limited by dashed vertical lines 115. It is noted that the adapted heights in the reduction curve 113 do not contain the height of the frame any more. Both the reduction of the marking material usage, represented by an area under the dashed graph 112, and the maximum height from the heights of the reduction curve 113, determining the print time of the relief image, are significant. The dashed graph 112 extends into the edge regions by means of the graph parts 114 due to application of step T3 of FIG. 10.

The present invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method for generating a relief print on a substantially flat substrate, wherein palpable differences exist between a height of various parts of the relief print, by a printer configured to print a relief print in a number of passes, the method comprising the steps of:
   a) defining a rasterized relief image, comprising customary color channels for indicating a color of each pixel and a height channel for indicating a height of each pixel of the rasterized relief image;
   b) determining a low spatial frequency height component in the height value of a pixel of the rasterized relief image by applying a filter operation by means of a convex kernel;
   c) subtracting the determined low spatial frequency height component from the height value of a pixel of the rasterized relief image resulting in a reduced height value; and
   d) printing the rasterized relief image by using the reduced height value,
   wherein the step of determining the low spatial frequency height component comprises the sub-steps of:
   b1) moving the convex kernel over a plurality of positions in the rasterized relief image;
   b2) for each position of the plurality of positions, determining a minimum height difference between the image height and the kernel height; and
   b3) for each position of the plurality of positions, setting the low spatial frequency height component to the minimum height difference determined in step b2).

2. The method according to claim 1, wherein the step of determining the low spatial frequency height component is applied to a plurality of pixel positions of the rasterized relief image, and the plurality of pixel positions is determined by a first step size of the filter operation in a first direction of the rasterized relief image perpendicular to a height direction and a second step size of the filter operation in a second direction of the rasterized relief image perpendicular to the height direction and not parallel to the first direction.

3. The method according to claim 2, wherein the first step size and the second step size are equal in size.

4. The method according to claim 3, wherein the first step size and the second step size are equal to the size of one pixel dimension.

5. The method according to claim 2, further comprising the step of adapting the convex kernel by broadening the top of the convex kernel by the first step size in the first direction and by the second step size in the second direction.

6. The method according to claim 2, wherein a three-dimensional representation of the convex kernel has a paraboloidal shape.

7. The method according to claim 1, wherein the method comprises the steps of:
   e) dividing the rasterized relief image into a central region and an edge region, the edge region consisting of image pixels that are within a predetermined distance from an edge of the rasterized relief image;
   f) applying the steps a)-d) to the central region of the rasterized relief image, for a pixel in the edge region;
   g) determining a pixel in the central region closest to the pixel in the edge region;
   h) subtracting the low spatial frequency height component of the closest pixel from the height value of the pixel in the edge region, resulting in a reduced height value for the pixel in the edge region; and
   i) clipping the reduced height value for the pixel in the edge region to a zero height value, if the resulting reduced height for the pixel in the edge region has a negative value.

8. A computer program product, including computer readable code embodied on a non-transitory computer readable medium, said computer readable code comprising instructions for executing the steps of the method according to claim 1.

9. A print system configured to generate relief prints on a substantially flat substrate in a number of passes, wherein palpable differences exist between a height of various parts of the relief print, the print system comprising a print controller and a print engine, the print controller comprising:
   a receiving unit configured to receive a rasterized relief image, comprising customary color channels for indicating a color of each pixel and a height channel for indicating a height of each pixel of the rasterized relief image;
   a determining unit configured to determine a low spatial frequency height component in the height channel of a pixel of the rasterized relief image by applying a filter operation by means of a convex kernel; and
   a subtracting unit configured to subtract the determined low spatial frequency height component from the height of a pixel of the rasterized relief image resulting in a reduced height,
   wherein the print engine is configured to print the rasterized relief image by taking the reduced height of the pixel into account, and
   wherein the determining unit is configured to:
   move the convex kernel over a plurality of positions in the rasterized relief image;
   for each position of the plurality of positions, determine a minimum height difference between the image height and the kernel height; and
   for each position of the plurality of positions, set the low spatial frequency height component to the determined minimum height difference.

* * * * *